Figure 1:
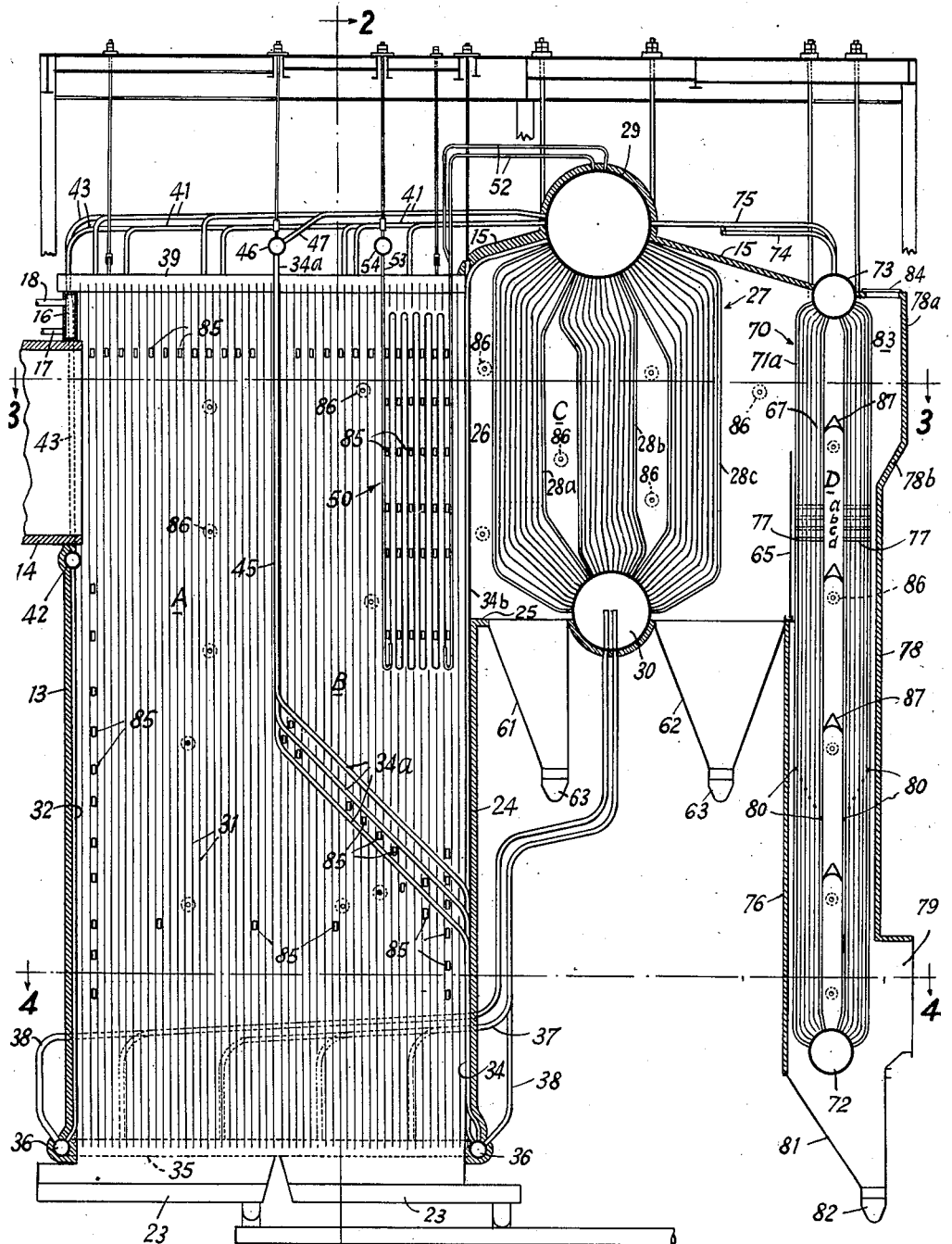

Dec. 9, 1952     C. L. MARQUEZ, JR     2,620,780
WASTE HEAT VAPOR GENERATOR

Filed Aug. 10, 1949     3 Sheets-Sheet 1

INVENTOR
Charles L. Marquez, Jr.
BY
ATTORNEY

Dec. 9, 1952 C. L. MARQUEZ, JR 2,620,780
WASTE HEAT VAPOR GENERATOR
Filed Aug. 10, 1949 3 Sheets-Sheet 3

INVENTOR
Charles L. Marquez, Jr.
BY
J. P. Moran
ATTORNEY

Patented Dec. 9, 1952

UNITED STATES PATENT OFFICE 2,620,780

WASTE HEAT VAPOR GENERATOR

Charles L. Marquez, Jr., Jersey City, N. J., assignor to The Babcock & Wilcox Company, New York, N. Y., a corporation of New Jersey Application August 10, 1949, Serial No. 109,488

12 Claims. (Cl. 122—7)

The present invention relates in general to the construction and operation of vapor generators, and more particularly to steam generators of the water tube type deriving heat from waste gases carrying a substantial proportion of solids. For the purposes of this application, it may be assumed that the source of such gases is a known type of metallurgical furnace especially adapted for the recovery of zinc and lead from blast furnace slag in accordance with certain established slag fuming processes, the recovery of the named metals being in the form of zinc oxide and lead oxide.

As an example of the aforesaid processes, the fuming furnace is charged to a suitable capacity with blast furnace slag and the furnace fired with pulverized coal which is injected below the slag level along with air in the amount required for combustion. The firing is continued to maintain the slag molten and to elevate the temperature of the slag bath to the metallic zinc vaporizing temperature. At this point the total air for combustion is reduced below the initial value so as to provide a highly reducing atmosphere within the furnace reaction zone. The metallic zinc is released as a vapor that rises rapidly to emerge from the slag and becomes reoxidized above the slag bath where tertiary air is introduced. The reaction involved in the fuming operation or process may be indicated by the following three end equations:

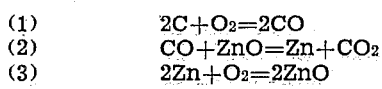

(1) $2C + O_2 = 2CO$
(2) $CO + ZnO = Zn + CO_2$
(3) $2Zn + O_2 = 2ZnO$ the net thermal effect of the reaction being the equivalent to complete oxidation of the carbon in the fuel. Lead oxide in the slag is volatilized at the temperature of the slag and leaves the bath also as an oxide.

In the normal operation of the slag fuming furnace the resulting flue gases are discharged at temperatures in excess of 2000° F. and thus constitute a source of available waste heat which may advantageously be utilized in the vapor generating unit hereinafter described. Since the gases contain a large proportion of finely divided solids or dust of a fluffy and especially adherent character it is essential that the vapor generator to which such gases are admitted have its various heating surface sections or components so arranged as to either be self-cleaning or at least readily accessible at all times for cleaning by soot blowers, for example, or by other suitable means. A representative analysis of the dust content of flue gases from a slag fuming furnace indicates a zinc oxide content of 4.98%, and a lead oxide content of 0.37%, each in terms of the weight of the dust laden gases as discharged.

My invention therefore contemplates a vapor generating unit adapted to receive hot flue gases direct from an exterior source such as a slag fuming furnace, or the like, and having its total heating surface distributed throughout a plurality of zones through which the gases are directed successively and furthermore are caused to flow therethrough in such manner, both with respect to the directions and velocities of flow, as to cause a substantial proportion of the solids to be deposited therefrom for collection at successive points below the path of the gases. In the initial zone or zones, the heating surface is associated mainly with the boundary walls which are particularly adapted for the absorption of radiant heat from the flame and gases passing therethrough. In subsequent zones, as the gases and entrained solids become cooler, a substantial amount of heating surface is desirably interposed in the path of the gases for absorption of heat by convection. In a subsequent zone, or plurality of zones, the total heating surface therein is either entirely or preponderantly of the convection type, with upright tubes arranged in successive parallel planes spaced transversely of gas flow so as to form a series of relatively wide unobstructed lanes and thereby provide a multiple gas flow path of a character least liable to become plugged up by dust in the gases and especially adapted for cleaning by mass action soot blowers moving progressively from side to side of the setting. The convection sections of the unit are preferably arranged for single-pass flow of gases therethrough so as to minimize the accumulation of solids therein and to maintain a low draft loss throughout the unit. The single pass arrangement, also minimizes erosion of tubes by the gas entrained dust, whereas with other arrangements, erosion of tubes would be expected at the turns where changes in direction occur within the tube banks.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Figure 2:
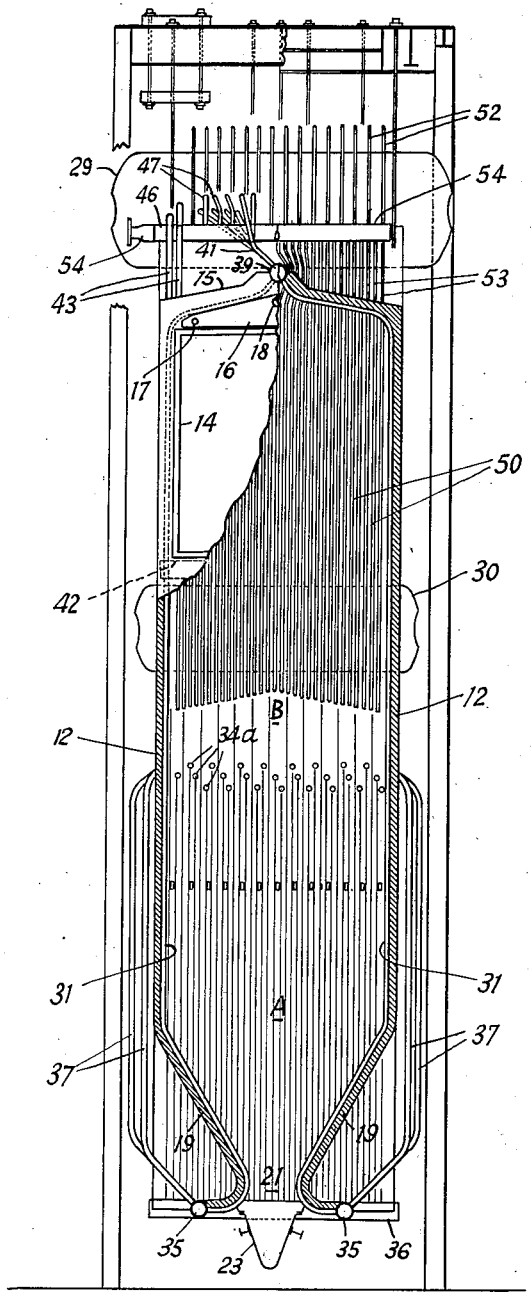
Figure 3:
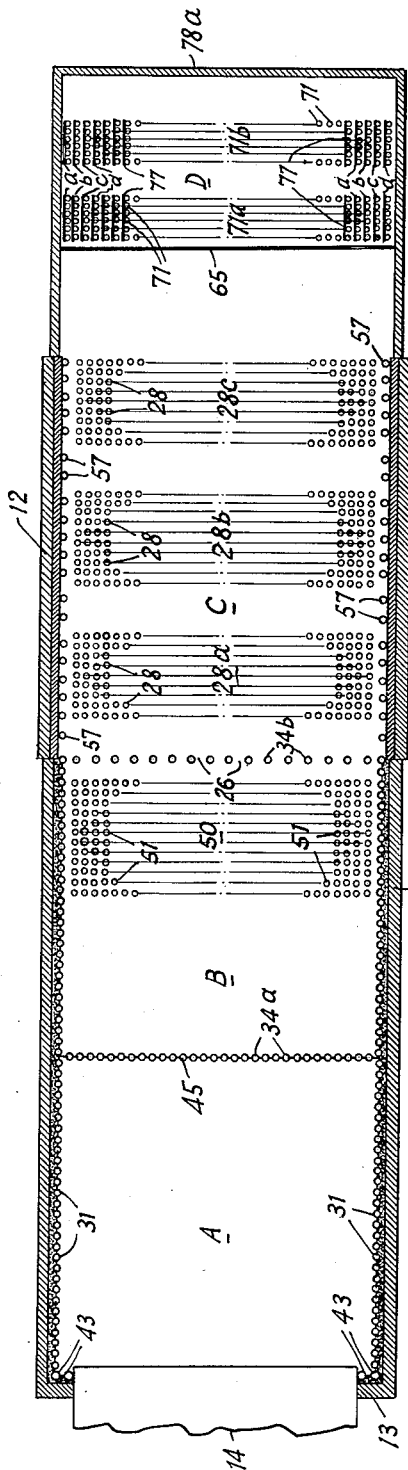
Figure 4:
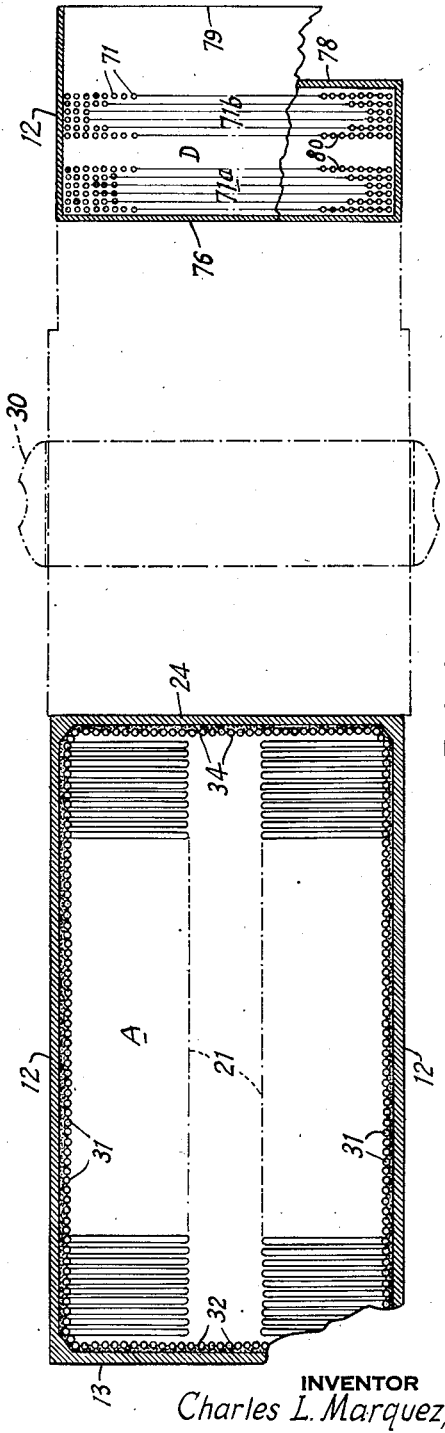

Of the drawings:

Fig. 1 is a sectional side elevation of a vapor generating unit embodying the various features of my invention;

Fig. 2 is a front elevation of the subject vapor generating unit, mainly in section along line 2—2 of Fig. 1; and Figs. 3 and 4 are plan views of the illustrated unit, taken along lines 3—3 and 4—4 respectively of Fig. 1.

In more detail, Figs. 1–4 illustrate an embodiment of my invention in the form of a steam generating unit particularly adapted for operation as a waste heat water tube boiler deriving heat from an exterior source of high temperature heating gases. As previously indicated, such a source may be assumed to be a metallurgical furnace of the type commonly known as a slag fuming furnace operable primarily for the recovery of such metals as zinc and lead from blast furnace slag resulting from operation of a modern smelting system. For convenience of description the illustrated unit will be considered as divided into four successive sections or zones, namely, a gas inlet section A, a superheater section B, a boiler section C, and an economizer section D. The entire unit including all heating surface forming, or contained in, these four sections is suitably suspended from an overhead structure by means of a series of hangers as indicated.

The unit is defined in part by upright side walls 12, 12 which are common to all four sections and furthermore are substantially parallel and equally spaced throughout the major portions thereof. The inlet zone A is further defined by an upright front wall 13 which is interrupted toward the upper part of the setting to accommodate a gas inlet or crossover flue 14 of rectangular cross section for conducting waste heat gases from a fuming furnace, for example, direct to the gas inlet zone A of the illustrated vapor generating unit. As seen in Fig. 2, the side walls 12, 12 of zones A and B converge at their upper ends to form a common upper wall or roof 15 and thus define above flue 14 a somewhat triangular front wall space for which the closure comprises a water jacket 16 having water inlet and outlet connections 17 and 18, respectively. In zone A, the lower portions of side walls 12 converge downwardly as at 19 to provide a hopper bottom having a discharge opening 21 through which solids which are deposited from the gas stream are directed into suitable conveyors 23 for removal from the unit. Rear wall 24 of zone A extends upwardly to the bottom level 25 of boiler zone C, to provide the upright rear wall of superheater zone B. The roof 15 over zones A and B is continued upwardly over a forward portion of zone C, to upper boiler drum 29, and the vertical space between the upper end of rear wall 24 and roof 15 provides the gas inlet opening 26 into zone C. In this last named zone, the boiler section comprises a two-drum, bent tube, single pass, water tube boiler 27 having upright tubes 28 extending between and connected at their opposite ends to upper and lower boiler drums 29 and 30 respectively, and being arranged in three successive banks 28a, 28b, and 28c spaced longitudinally of gas flow through the unit. Lower drum 30 is offset rearwardly with respect to upper drum 29 for reasons to be later set forth. The boiler banks are suitably spaced for the accommodation of soot blowers, as indicated, and the banks made relatively shallow in the front-to-rear direction for effective penetration of the soot blower jets.

The upright walls 12, 13 and 24, of zones A and B, which define a setting of rectangular horizontal cross section, as indicated in Fig. 4, are lined throughout with closely spaced upright wall cooling tubes 31, 32 and 34 which are connected at their lower ends to lower side, front and rear wall headers 35 and 36 as indicated. In each side wall 12, and in front wall 13, the wall tubes 31 and 32 respectively are suitably of 3 inch O. D. and arranged at 4½ inch center-to-center spacings, with metallic closures of known type provided for the intertube spaces, in the form of metallic plates or bars disposed intermediate the tubes and secured to one or both of each pair of adjacent tubes so as to expose a substantially continuous metallic surface toward the interior of the zone. In rear wall 24, throughout the lower portion thereof, the wall tubes 34 are suitably of 3 inch O. D. and arranged at 3 inch center-to-center spacings so as to present a substantially continuous metallic surface toward the interior of zone A without the need of auxiliary intertube space closure means. Makeup connections or downcomers 37 and 38, having their lower ends connected to lower wall headers 35 and 36 respectively, are connected at their upper ends to the lower boiler drum 30.

The upper ends of side wall tubes 31 conform to the arched contour of roof 15 over zones A and B and are connected to a central upper longitudinal header 39 from which a series of riser connections 41 extend at intervals therealong to the upper boiler drum 29. In front wall 13, the tubes 32 extend upwardly to an upper transverse header 42 arranged in subjacent relation to the gas inlet flue 14. Riser connections 43, of larger diameters than front wall tubes 32, and having their lower ends connected to header 42, are arranged in groups of two, for example, at opposite sides of flue 14, and connected at their upper ends to the upper, steam and water drum 29.

In the lower portion of rear wall 24, all tubes 34 are tightly spaced, as hereinbefore described, whereas at higher elevations, beginning at approximately the level of the upper ends of the inclined hopper walls 19, selected tubes 34a of the row, are bent forwardly out of their vertical positions adjacent wall 24 and extended diagonally upward in a plurality of vertically spaced rows to form a widely spaced tube screen, as shown, across the entrance to superheater zone B. Above the screen, the tubes 34a are again brought into alignment in a common vertical plane to form a gas deflecting baffle 45 partitioning the upper part of gas inlet zone A from the next adjacent superheater zone B. The portions of tubes 34a in baffle 45 are arranged at 4½ inch center-to-center spacings and accordingly are suitably provided with the customary intertube space closure means to form a solid wall presenting smooth and substantially continuous metallic surfaces at opposite sides. The upper end portions of the screen and baffle tubes 34a extend through roof 15 to the exterior of the setting where they are connected to a transverse header 46 from which riser connections 47 extend to the steam and water drum 29. In the upper portion of rear wall 24, the remaining tubes 34b are continued upwardly at 9 inch center-to-center spacings, along the upper portion of rear wall 24 and across the gas inlet opening 26 into boiler zone C, with the upper ends of tubes 34b connected to the steam and water drum 29.

Since the gases enter zone A adjacent its uppermost portion, the direction of gas flow is mainly downward throughout the greater part of the height of the zone. This long downflow pass of the gases provides an appreciable time element which permits any metallic vapors still present in the gases to become oxidized. Toward the bottom enlarged portion of zone A, the direction of the gas stream is reversed over the lowermost hopper portion 19, and as a result of this reversal and the decrease in gas velocity in this region, dust and slag particles are deposited from the gas stream into the hopper immediately below.

In zone B, the superheater 51 is of the pendant continuous-tube type having multiple loop coils or platens arranged in parallel planes, equally spaced across the width of zone B between opposite side walls 12. The superheater tubes are suitably of 2 inch O. D. and arranged in a single bank at spacings of 4½ inch center-to-center, both transversely and longitudinally of the setting. The steam inlet and outlet connections 52 and 53 are formed as continuations of the tubes and are connected respectively to the upper boiler drum 29 and the exterior superheater outlet header 54. The superheater loops extend downwardly from adjacent the arched roof 15 to positions below the floor level 25 of boiler zone C, and thus provide an arrangement of superheater surface, including portions of the inlet and outlet connections 52 and 53, which extend entirely across the area of gas inlet 26 to boiler zone C and also to a certain extent beyond. The superheater is advantageously positioned in that it occupies only the rear upper portion of zone B so as to allow gases entering the zone to pass upwardly to the uppermost part of the zone, forwardly of the superheater, and thus be more uniformly distributed throughout the height of the zone before entering the superheater. The superheater loops throughout bank 50 are of equal lengths so as to equalize heating surface in all flow channels of the superheater and thereby provide uniform vapor temperatures in all superheater tubes. The upper ends of the loops are uniformly spaced from the arched roof 15 and thus a correspondingly arched arrangement of lower ends is provided as indicated in Fig. 2.

In zone C, wherein the boiler section comprises upright tubes 28 connected to upper and lower drums 29 and 30, the tubes 28 throughout all three banks are suitably of 2 inch O. D. and arranged in parallel planes, parallel to side walls 12, at 4½ inch center-to-center spacings across the width of the zone. Larger diameter boiler tubes 57, connected to the drums adjacent opposite ends, are disposed along the inner surfaces of opposite side walls 12. It will be noted that the boiler tubes 28 are of the same diameter, and arranged at the same equal spacings transversely of the setting, as the superheater tubes 51, and furthermore are disposed in the same parallel planes to provide substantial continuity of straight, parallel, gas lanes of equal widths throughout the superheater and all three banks of boiler tubes 28. The vertical tube lengths 34b which are disposed in a row between the superheater and boiler sections are also in longitudinal alignment with alternate tubes of the banks at opposite sides and thus contribute to the maintenance of straight line gas flow through the four successive tube banks located in zones B and C. The bottom of zone C, at approximately the centerline of lower drum 30, is open substantially throughout its entire area to hoppers 61 and 62, each of which discharges into a conveyor 63 for removal of accumulated solids. The rearwardly offset position of lower drum 30, as previously mentioned, permits a larger area of entrance to hopper 61 to be provided than if both drums were in vertical alignment, while maintaining the same position of the boiler banks relative to superheater 50. The roof 15 is extended beyond the final boiler bank 28c at the downstream side and, with plate wall 65 which extends upwardly from floor 25, defines a gas flow passage 67 connecting boiler zone C with economizer zone D.

The economizer 70 in zone D comprises long lengths of upright tubes 71 arranged in spaced banks 71a and 71b and extending between and connected at their opposite ends to a lower water inlet drum and an upper water outlet drum 72 and 73, respectively. Both drums 72 and 73 are arranged transversely of the setting, parallel to boiler drums 29 and 30, with the upper drum 73 disposed at approximately the same elevation as the upper header 39 associated with zones A and B and thus at a somewhat lower elevation than the steam and water drum 29. The lower economizer drum 72 is disposed at approximately the elevation of the lower hopper portion 19 of zone A. Riser tubes 74 and 75 extend from the economizer outlet drum 73 to the boiler steam and water drum 29, and horizontal portions thereof are preferably formed with reverse bends therein, and the tubes thus transposed end-for-end in their connections to the respective drums, in known manner, so as to provide adequate flexibility.

The economizer 70 is disposed within a vertically elongated flue which forms zone D and which is defined in part by portions of side walls 12 extending downwardly to an elevation slightly below the lower economizer drum 72. The front wall of the flue is formed in part by the interior plate wall 65 which extends upwardly from floor 25 of zone C and additionally by an exterior upright wall portion 76 which extends downwardly from floor 25 in vertical alignment with the upper front wall portion 65. The rear wall 78 extends downwardly from approximately the centerline position of upper drum 73 and terminates above lower drum 72 to provide a gas outlet 79 extending throughout the width of the setting and flue between side walls 12, the gas outlet 79 being normally subjected to induced draft under the influence of suitable means not shown. A hopper 81 is positioned at the lower end of the economizer flue for discharge of collected dust into conveyor 82. In practice, the conveyors 23, 63 and 82 may be inter-connected for discharge of dust to a common point of disposal or use.

The front and rear flue walls 76 and 78 are spaced from the tube banks 71a, 71b, so as to expose the entire perimeters of all tubes to the downflowing gases and also to render the operation of soot blowers between banks more effective while facilitating the downward movement of dust into the hopper. The uppermost rear wall portion 78a, opposite gas inlet 67, is spaced from the adjacent tube bank 71b a distance at least equal to the depth of the bank, throughout the height of the gas inlet, so as to provide additional space 83 which enables the gases to change their direction of flow at decreased velocity before continuing their flow through the banks in a downward and generally vertical direction. The transition from the main rear wall portion 78 to the offset uppermost portion 78a is made gradual, opposite the top end of front wall 65, by means of an inclined intermediate rear wall portion 78b. A series of lance doors 84 are provided in the roof above space 83, at intervals across the width of the flue, to facilitate the dislodgement of dust that might accumulate in this region.

In a commercial embodiment of my invention, the economizer headers 72 and 73 are vertically spaced, center-to-center, at about twice the vertical spacing of the boiler drums 29 and 30, and at about nine-tenths of the vertical spacing of the uppermost and lowermost headers 39 and 35 of zone A. Since the drawings of this application illustrate such an embodiment approximately to scale, the dimensional relationships of all parts of the unit are readily discernible. The economizer tubes 71, of 2 inch O. D., which are arranged in longitudinal and transverse rows on 3½ inch and 4½ inch centers, respectively, are therefore exceptionally long for this class of apparatus and accordingly require adequate restraint against vibration. By the means herein disclosed, the tubes are restrained in two directions, at right angles to each other, and at various elevations, as indicated in Figs. 1, 2 and 4. Thus, in each bank, at a location about one-third of the tube length distance down from header 73, the tubes 71 in successive longitudinal rows are tied together by bars 77 arranged in groups of four, for each four successive rows, with successive bars $a$, $b$, $c$, $d$ of each group welded or otherwise secured to the tubes of the respective rows at four different elevations, as indicated in Fig. 1. The arrangement of bars 77 is repeated for each four rows throughout each bank. At a lower elevation, about one-third of the tube length distance up from header 72, the tubes 71 in successive transverse rows are tied together by studs 80 welded or otherwise secured to adjacent tubes throughout each transverse row at a common elevation, and in each next adjacent transverse row at a different elevation, to provide the distribution of studs 80 indicated in Figs. 1 and 4. The arrangements of bars 77 and studs 80, while serving the purpose of minimizing vibration of long, small diameter tubes, are particularly advantageous in that by distributing the ties throughout a plurality of elevations, any reduction of gas flow area resulting from their use is also maintained at a minimum at any one elevation.

Provision is made at numerous locations throughout the unit for maintaining the various heating surface components relatively free from dust accumulations so as to provide the maximum rate of heat absorption during operation. For example, lance ports 85, which are indicated by small vertically elongated rectangles in Figs. 1 and 2, are provided at the more critical locations such as adjacent the various tube lined boundary walls of zones A and B, and between and adjacent the rows of screen tubes 34$a$ and superheater tubes 51. Similar ports 85, not indicated, are also provided in side walls 12 opposite the spaces between rows of boiler tubes 27, and economizer tubes 71, in the respective banks. Provision is also made for utilizing soot blowers, either of the fixed or retractable type, at various locations, as indicated by dotted circles 86. In the economizer 70, a gabled hood 87 is positioned above each soot blower location 86 as a protection for each soot blower from entrained or dislodged dust and also as a gas deflecting means for maintaining gas distribution throughout the entire cross section of the tube banks 71$a$ and 71$b$. The necessity for maintaining the various heating surface components of the unit free of excessive accumulations of dust during normal operation has therefore been an important factor in providing the specific arrangement of heating surface herein described and illustrated.

While in accordance with the provisions of the statutes I have illustrated and described herein the best form of my invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. A vapor generating unit comprising a natural circulation boiler section through which heating gases are directed in a single horizontal pass, a fluid cooled setting providing serially connected gas flow zones preceding said boiler section and in which said gases are directed downwardly in the first of said zones and upwardly in the last of said zones, and means defining a gas inlet opening directly into said boiler section from the upper portion of said last zone, said means including an upright fluid cooled wall forming the rearward boundary of said last zone and formed with horizontally spaced tubes extending upwardly across said inlet, said boiler section comprising an upper and a lower drum disposed respectively at elevations corresponding to the upper and lower margins of said inlet together with upright tubes disposed in vertical planes arranged at right angles to the plane of said inlet and defining a series of unobstructed parallel gas flow lanes extending throughout the vertical distance separating said drums.

2. A vapor generating unit as defined in claim 1 and further characterized by the respective drums being offset from said inlet at different distances and with said lower drum being offset at the greater of said distances.

3. A vapor generating unit as defined in claim 2 wherein the lower of said drums is of smaller diameter than said upper drum, and further characterized by a hopper positioned between said lower drum and said inlet and having opposite walls sealed respectively to said lower inlet margin and to said lower drum.

4. A waste heat vapor generating unit deriving heat from dust laden gases discharging from a metallurgical furnace and comprising a natural circulation boiler section through which said gases are directed in a single horizontal pass, a fluid cooled setting providing serially connected gas flow zones preceding said boiler section and in which said gases are directed downwardly in the first of said zones and upwardly in the last of said zones, said downflow zone having its entire lower portion unobstructed and continuing rearwardly beneath the next succeeding zone, and means defining a gas inlet into said boiler section from the upper portion of said last zone, said means including a vertically arranged fluid cooled wall forming the rearward boundary of said last zone and its upper end forming the lower margin of said gas inlet, said boiler section comprising an upper and a lower drum together with upright tubes extending between and connected at opposite ends to said drums, said tubes being arranged in separate banks successively spaced from said inlet and being disposed in parallel vertical planes so as to define parallel gas flow lanes in horizontal alignment throughout said banks, said fluid cooled wall comprising horizontally spaced tubes which are continued upwardly across said gas inlet and connected at their upper ends to said upper drum.

5. A waste heat vapor generator deriving heat from dust laden gases and comprising a natural circulation boiler section through which said gases are directed, a fluid cooled setting providing serially connected gas flow zones preceding said boiler section, said setting having a front and a rear wall and opposing side walls each arranged upright and including upright fluid cooling tubes, said side walls having upper converging portions forming an arch over the top of said zones and having lower converging portions forming a hopper at the bottom thereof, a header associated with said arch to which said side wall tubes are connected, riser connections extending from said header to said boiler section, make up connections extending from said boiler section to the lower ends of said tubes associated with said hopper side walls, said front wall providing a gas inlet adjacent said arch into the first of said zones, said rear wall providing a gas outlet from the second of said zones into said boiler section at approximately the elevation of said inlet, and a partition extending downwardly from said arch to effect reversal of gas flow adjacent said hopper from the first to the second of said zones.

6. A waste heat vapor generating unit comprising a natural circulation boiler section having an upper and a lower drum together with upright tubes extending between and connected at opposite ends to said drums, a fluid cooled setting having a front and a rear upright wall arranged parallel to said drums and having a partition extending downwardly between said walls and defining therewith a pair of serially connected gas flow zones, in the first of which zones heating gases admitted to an upper portion thereof are caused to flow downwardly and in the second of which zones are caused to flow upwardly, said setting having fluid cooled side walls including inclined lower end portions defining a hopper extending transversely of said front and rear walls below both of said zones, said front wall having a heating gas inlet in an upper portion thereof through which said gases are admitted to said first zone, said rear wall being vertically arranged and having a heating gas outlet in an upper portion thereof through which said gases are discharged from said second zone into said boiler section, a plurality of upright tubes having intermediate portions inclined downwardly and rearwardly below said second zone and having opposite end portions embodied respectively in the structures of said partition and the lower end portion of said rear wall, and other tubes having lower end portions embodied in the structure of said rear wall in interspersed relation with said first named wall tubes and having upper end portions disposed in spaced relation across said heating gas outlet.

7. In a waste heat vapor generating unit having its heating surface distributed throughout a plurality of zones through which heating gases are directed successively, said zones including a first zone in which said gases are directed downwardly and a second zone in which said gases are directed upwardly, a single-pass natural circulation boiler section in a third zone of said plurality and comprising an upper and a lower drum together with upright tubes extending between and connected at opposite ends to said drums, said boiler section being confined to an elevation corresponding to the elevation of the uppermost portions of said first two named zones and said drums being vertically spaced at a distance less than half the height of said first zone, and an economizer arranged in the last of said zones and discharging into a drum of said boiler section, said economizer having vertically extending tubes arranged in at least one bank and of lengths approximately twice the vertical spacing of said boiler drums, said economizer being confined between front and rear walls arranged closely adjacent the respective sides of the economizer throughout the major portion of the length thereof, with the upper portion of the rear economizer wall being rearwardly offset from its greater length lower portion to provide a gas turning space wherein velocity of the gases is reduced prior to continuance of flow in a downward direction through said economizer.

8. A waste heat vapor generating unit comprising a boiler section having upright tubes over which heating gases are directed in a single horizontal pass, an elevated boiler drum to which the upper ends of said tubes are connected, a fluid cooled setting providing serially connected gas flow zones preceding said boiler section and having an arched roof over both of said zones at an elevation below the centerline position of said drum, said setting having opposite side walls extended to form said roof and having an upright front wall facing said boiler section and formed with a heating gas inlet therein to the first of said zones, said inlet having its upper and lower margins downwardly spaced from said roof, a header arranged centrally of said roof in transverse relation to said drum and fluid cooling tubes associated with said opposite side walls and extended to said header, a fluid cooled chambered member defining the upper margin of said inlet and forming the portion of said front wall between said upper margin and said roof, said front wall below said inlet comprising upright tubes and a header subjacent said inlet to which header the upper ends of said front wall tubes are connected, means for maintaining circulation of fluid through said front wall tubes comprising riser tubes arranged at opposite sides of said inlet and connecting said front wall header to said upper drum, means for separately maintaining circulation of fluid through said chambered member, and riser tubes connecting said roof header to said upper drum.

9. A waste heat vapor generating unit as defined in claim 6 and further comprising a superheater in an upper portion of said second zone adjacent said outlet and confined to a rearward space less than half the width of said zone between said outlet and said partition, said superheater being formed of continuous loops extending substantially throughout the height of said outlet and to positions below said outlet, said loops being disposed in parallel planes arranged transversely of the plane of said outlet.

10. A vapor generating unit comprising a boiler section through which heating gases are directed in a single horizontal pass, a fluid cooled setting providing serially connected gas flow zones preceding said boiler section and wherein said gases are directed downwardly in the first of said zones and upwardly in the last of said zones, a partition extending downwardly from an upper portion of said setting and separating said last zone from the next preceding zone, means defining a heating gas inlet opening directly into said boiler section from the upper portion of said last zone, said means including an upright fluid cooled wall forming the rearward boundary of said last zone and formed with tubes extending upwardly in horizontally spaced succession across said inlet, said boiler section comprising an upper and a lower drum disposed respectively at elevations corresponding to the upper and lower margins of said inlet together with upright tubes disposed in vertical planes arranged at right angles to the plane of said inlet and defining a series of single pass gas flow lanes extending throughout the vertical distance separating said drums.

11. A vapor generating unit as defined in claim 10 and further comprising a superheater in an upper portion of said last zone adjacent said inlet and confined to a location rearwardly spaced from said partition, said superheater being formed of tubes extending substantially throughout the height of said inlet and to positions subjacent said inlet, said superheater tubes being disposed in parallel planes arranged transversely of the plane of said inlet.

12. A vapor generating unit as defined in claim 11 and further comprising upright tubes having intermediate portions inclined downwardly and rearwardly in screen formation below said superheater and having opposite end portions forming respectively a part of said partition and being embodied in the lower end portion of said wall forming said rearward boundary.

CHARLES L. MARQUEZ, Jr.

REFERENCES CITED

The following references are of record in the file of this patent:

UNITED STATES PATENTS

| Number | Name | Date |
|---|---|---|
| 1,343,315 | Downs et al. | June 15, 1920 |
| 1,743,326 | Davy | Jan. 14, 1930 |
| 1,872,138 | Grady | Aug. 16, 1932 |
| 1,878,908 | Steinmuller | Sept. 20, 1932 |
| 2,126,524 | Wood | Aug. 9, 1938 |
| 2,139,348 | Badenhausen | Dec. 6, 1938 |
| 2,206,265 | Saatoff | July 2, 1940 |
| 2,271,639 | Hardgrove | Feb. 3, 1942 |
| 2,284,601 | Shellenberger et al. | May 26, 1942 |
| 2,310,801 | Mayo et al. | Feb. 9, 1943 |
| 2,498,761 | Kuhner | Feb. 28, 1950 |

FOREIGN PATENTS

| Number | Country | Date |
|---|---|---|
| 482,684 | Great Britain | Apr. 4, 1938 |